W. H. Akins & J. C. Burritt. Sheet 4 Sheets.

Clock Calendar.

No. 3694. Reissued Nov. 2. 1869.

UNITED STATES PATENT OFFICE.

WILLIAM H. AKINS AND JOSEPH C. BURRITT, OF ITHACA, NEW YORK.

IMPROVEMENT IN CALENDAR-CLOCKS.

Specification forming part of Letters Patent No. 11,711, dated September 19, 1854; extended seven years; Reissue No. 3,694, dated November 2, 1869.

*To all whom it may concern:*

Be it known that we, WILLIAM H. AKINS and JOSEPH C. BURRITT, of Ithaca, Tompkins county, New York, have invented certain new and useful Improvements in Calendar-Clocks; and that on the 19th day of September, 1854, we did obtain Letters Patent for the same, which Letters Patent were extended to us for the period of seven years from the just-named date, on the 18th day of September, 1868; and owing to deficiencies in our title, specification, and claims, or certain portions of these, which we believe have occurred through inadvertency, mistake, or other errors, and not by any fraudulent intent, we have surrendered the said extended Letters Patent and have requested new reissued Letters Patent in their place: Now, therefore, we do declare that the following is a full and accurate description of our invention, reference being had to the accompanying drawings, and to the letters thereon.

Figure 4:
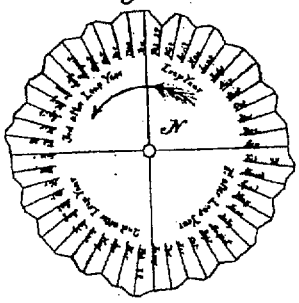
Figure 5:
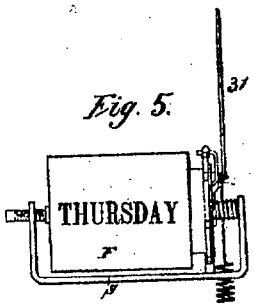
Figure 6:
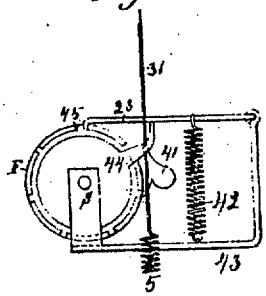
Figure 7:
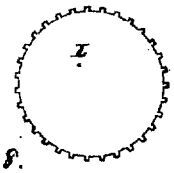
Figure 8:
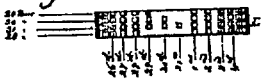
Figure 9:
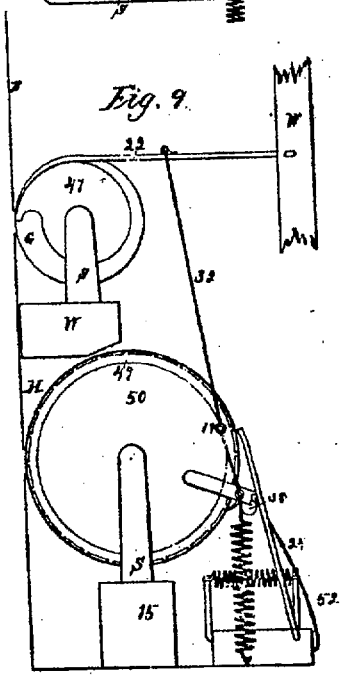
Figure 10:
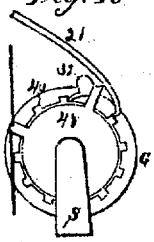

Figure 1 is a front view of one form of our calendar clock; Fig. 2, the front view, with the face removed; Fig. 3, a back view with the back of the case removed; Fig. 4, a view of the four-year cam N; Fig. 5, a view of roller F for the days of the week; Fig. 6, an end view of roller F with the means by which it is moved. Fig. 7 is a side view of the month-wheel L; Fig. 8, a view from above, showing the arrangement of the teeth and the irregular month-spaces on it. Fig. 9 is an end view of the month-cylinder G and helix or cam 47, which actuates the four-year wheel, and also the end of cylinder H; Fig. 10, end view of the month-cylinder G and means of moving it.

In these various figures are the following parts: A, the clock-case; B, dial with a circle of figures from 1 to 31, for the days of the months, and having three apertures, C, D, and E for the showing of the cylinder changes; F, cylinder for the days of the week; G, cylinder for the various months; H, cylinder with a limited number of years on it, useful but not essential to our calendar; I, hand or pointer for the day of the month on dial B; J, time-dial; K, wheel in the time-movement, revolving once in twenty-four hours; L, wheel revolving once each month, with four rows of teeth, all beginning in a line across the wheel, and one row having thirty-one equal teeth for all months of thirty-one days; one row of thirty teeth, the thirty-first tooth removed for all months of thirty days; one row of twenty-nine teeth, having the thirtieth and thirty-first teeth removed for use only in February of leap-year; one row having the twenty-ninth, thirtieth, and thirty-first teeth removed for use in February of the first, second, and third years after leap-year; and M, a wheel of forty-eight teeth, to move the four-year cam N, which cam N, raising and lowering the arm O and by it turning the rock-shaft P, so that the detent or stop X, resting on the wheel L, is, by means of the slotted arm Q, held to the row of thirty-one teeth for the months of January, March, May, July, August, October, and December, and to the row of thirty teeth for the months of April, June, September, and November, and to the row of twenty-nine teeth for the month of February of leap-year, and to the row of twenty-eight teeth for the month of February in the first, second, and third after leap-year, the arm O being kept in contact with the four-year cam N by the spring R, the said cam moving forward at the beginning of each month. S S S S S are stands for the wheels L and M and the cylinders F, G, and H, and T, stand for the detent X, and U, spring drawing the detent X in place between the teeth of the wheel L when allowed by the cam V so to be drawn; V, the cam revolving once in twenty-four hours in the time-movement; W W W, bars to which the various parts are attached; X, the detent of the month-wheel, so secured to its stand T as to have a motion upward over the teeth of the month-wheel L and laterally to act on its various rows of teeth; Y, lever moved by the time-cam V, acting with the rods 30 and 31 to move the calendar, and by the cam V controlling the movement of the calendar and pivoted at Z; and Q, cam on the shaft of the wheel L to produce the changes of the month-cylinder G; 47, cam on the shaft of the month-cylinder, and producing changes in the year-cylinder H once a year; 4 5 6 7 8 9 10 11 12 13, springs, the use of which are to retract and move various parts, as described. 14, stand for the wheel K; 16, 17, 18, 19, 20, and 22, levers and lifting-rods, which are described farther on; 21, 23, 24, and 56, detents and stops; 25, 26, and 27, screw-points acting for friction on and as journals for the cylinders; 28 and 20, pivot-screws; 30, 31, 32, and 33, lifting-rods; 34, arm from lever 16 for the action of the month-cam on the four-year wheel; 36, spring; 37, 38, 39, 40, and 41, clicks for moving various wheels; 42, spring; 43, detent-stand for 23; 44, plate, loose on the shaft of the week-cylinder F and against wheel 45, which wheel 45 has seven teeth, the click 41 being attached to the arm of plate 44, the upper end of which arm raises detent 23 whenever the lifting-rod 31 is raised by the cam V; 46, wheel having twelve teeth and fast to the end of cylinder G; 47, cam on the end of the year cylinder G opposite wheel 46, the click 39 being attached to an arm from plate 48, the end of which raises the detent 21, when lever 16 is raised by helix or cam 2; 49, wheel with twenty-four or any number of teeth for any number of years to be put on it and fast to the year-dated cylinder H; 50, loose plate on shaft of roller H by the side of wheel 49, the click 38 being attached to an arm of plate 50, which arm raises the detent 24, when lever 22 is raised by cam 47; 52, spring for throwing click 38 in place; 53, plate loose on shaft of wheel M and close to it, the click 40 being an arm of said plate, and acting on wheel M when raised by arm 34; 54, plate loose on shaft of wheel L close to said wheel, to which is attached click 37 on its arm; 55, arm or stud fast to rod 30 under and lifting detent X.

Operation: Let wheel L be in a position to show by the hand I the first day of the month, the detent X resting against the line of teeth indicated for the first day of the month, and on the row having thirty-one teeth, as shown in drawing Fig. 8. The roller F in a position to show Sunday. The roller G in a position to show January. The cylinder H to show 1854, and the wheel M and plate or cam N in such a position that the arm O will lie on the ray marked January, second year after leap-year, in Fig. 4, and the wheel K, connecting the time-movement and calendar, having its helix or cam V, and revolving in the direction of the arrow once in twenty-four hours, raising the lever Y. The lifting rod 31 would raise the plate 44 high enough for click 41, moving cylinder F, to drop over the next tooth above the one on which it stood. Before being raised, the bent end of the arm of plate 44 having raised the detent 23 a little above the teeth of the wheel 45, Fig. 6, the rod 30 running loosely through the end of lever Y, and secured from falling out by a hook or nut at the top of it, would at the same time raise plate 54 high enough for click 37 to pass over four teeth on the wheel L, the arm or pin 55 on the side of rod 30 lifting the detent X a little above the teeth of wheel L at twelve o'clock at midnight, the clicks being carried into their places by weights or springs. The helix or cam V having moved forward enough to let the lever Y drop from its outer end, the springs 5 and 8, drawing down the clicks 41 and 37, turning cylinder F and wheel L, the detents X and 23, being drawn between the teeth of their respective wheels by the springs 42 and U, stopping cylinder F and wheel L after being moved one tooth each, the cylinder F will show Monday, and the hand I the second day of the month. The same changes of the days of the week and of the days of the month will be produced at every succeeding twelve o'clock at midnight. And as the wheel L revolves, the cam 2 on its shaft raises lever 16, which operates on roller G and wheel M in the same way, and by means of similar machinery, as lever Y operates on cylinder F and wheel L in the preceding operation, thus moving the roller G from January to February, as wheel L moved the hand I to the first day of the succeeding month. At the same time the wheel M, with cam N attached, is moved forward one forty-eighth of a revolution, raising the arm O on the top of the next ray of the plate or cam N, Fig. 4, removing the detent X in the wheel L, Fig. 8, marked as having twenty-eight teeth, it having stood on the one having thirty-one teeth during the preceding month of January, the month of February having only twenty-eight, and the plate N will turn one ray forward at the first day of each month, moving the detent X backward and forward on the face of the wheel L by means of the rocking shaft P, and arm O and Q, so as to show the right number of days in each month for four years, in which time the plate N performs one revolution.

The roller G with helix 47 attached, being moved forward monthly as in the preceding operation, would consequently make one revolution in each year, the cam 47 raising the click 38 by the intervening machinery, as shown in Fig. 9, the cam being so placed on the cylinder G as that the lever 22 will drop from the outer end of the cam, as the cylinder turns from December to January, thus allowing the machinery to turn the cylinder H so as to show 1855 at the same moment the other changes are being made, every change being made at precisely twelve o'clock at night.

The entire impulse of the movement of the whole and every part of the calendar is derived from the accompanying time-movement.

The advantages and uses of the invention we have made are apparent to those skilled in the art to which it appertains.

We claim—

1. The combination, in a calendar-clock, of a cam or disk which revolves but once in forty-eight months, with a thirty-one-day wheel, which revolves once in each month, when said parts are constructed and operated in such manner as to effect the desired changes in the number of days of the months, (including those of bi-sextile or leap-year,) as described.

2. The construction of a calendar-clock in such manner that the rod or lever which is operated by the twenty-four-hour wheel shall move the day-of-the-week-wheel forward one day at each revolution of the twenty-four-hour wheel, and shall also move variably the single click or ratchet which operates the thirty-one-day wheel over one, two, three, or four days or teeth, as the length of the month shall require.

3. The construction of the day-of-the-month wheel of a calendar-clock with four rows of teeth, numbering from 28 to 31, for the purpose set forth.

4. The combination, in a calendar-clock, of the following elements, namely: a dial provided with a circle of numbers representing the days of the month, apertures arranged within the circle for the days of the week and names of the months, and a calendar-movement operated by the time-movement of the clock.

5. The combination, in the dial of a calendar-clock, of a circle of figures from 1 to 31, inclusive, representing the days of the month, with a time-dial, an aperture through which to display the day of the week and an aperture for the names of the months, all arranged within the day-of-the-month circle, substantially as set forth.

6. The combination, in a calendar-clock, of one or more cylinders adapted to show the days of the week, the month, or the year, any or all of them, with the time-movement of the clock, when the cylinders are connected with said time-movement in such manner as to be operated by it, substantially as and for the purpose set forth.

7. The combination of cylinders F G, cliks or ratchets 39 and 41, oscillating about centers coincident with the centers of said cylinders, twenty-four-hour wheel, K and connecting devices, for the purpose set forth.

8. A dial exhibiting the name of the month inclosed within a circle of figures representing the days of the month, in combination with a calendar-movement operated by the time-movement of the clock.

9. The construction of a calendar-clock in such manner that the click or ratchet which actuates the thirty-one-day wheel may move variably over one or more teeth of said wheel, for the purpose set forth.

WM. H. AKINS,
JOSEPH C. BURRITT.

Witnesses:
SAMUEL J. PARKER,
T. J. MCELHENY, for J. C. B.,
A. M. LENOX, for W. H. A.